UNITED STATES PATENT OFFICE.

PAUL R. HERSCHMAN, OF FREEPORT, ILLINOIS, ASSIGNOR TO CHAS. L KIEWERT COMPANY, OF MILWAUKEE, WISCONSIN.

COMPOSITION OF MATTER TO BE USED AS PAINT.

No. 822,946.     Specification of Letters Patent.     Patented June 12, 1906.

Application filed November 3, 1905. Serial No. 285,683.

*To all whom it may concern:*

Be it known that I, PAUL R. HERSCHMAN, a citizen of the Empire of Austria-Hungary, residing at Freeport, in the State of Illinois, have invented a new and useful Composition of Matter to be Used as a Paint, of which the following is a description.

My new paint is a chemical product that as paint is especially adapted to be used as a coating for vessels or articles exposed to salt water or acids, the paint having the quality and capability of resisting acids and salt water and will not saponify in contact with salt water.

The paint consists of the product of the ingredients hereinafter enumerated, combined in the proportions and prepared in the manner hereinafter set forth.

Of shale-oil (a product obtained by dry distillation of the oleaginous material or crude oily matter of rock-shale, and which shale with oil are found at considerable depth in the earth underlying the soil in northern Illinois, such oil product being then washed in diluted acetic acid and boiled in an open caldron to eliminate all water therefrom by evaporation) take one hundred pounds and add thereto five pounds of sulfur and mix it, then in a closed caldron raise it by heat to a temperature of 250° Fahrenheit and continue this heat for three hours. Then add three pounds of peroxid of manganese ($MnO_2$) and continue the application of heat, keeping the mixture at a temperature approximately of 250° Fahrenheit for three hours more. This product must be thinned with a proper vehicle, as turpentine, benzin, or equivalent material, to put it in suitable condition for use as a paint.

What I claim as my invention is—

1. A composition for paint, consisting of shale-oil, sulfur, and peroxid of manganese, as herein described.

2. A composition for paint, consisting of substantially one hundred pounds of shale-oil, five pounds of sulfur, and three pounds of peroxid of manganese, treated and combined as set forth.

In testimony whereof I affix my signature in presence of two witnesses.

PAUL R. HERSCHMAN.

Witnesses:
    C. T. BENEDICT,
    ALMA A. KLUG.